Sept. 20, 1960 M. F. GARCIA 2,953,125
COOLING SYSTEM
Filed July 25, 1958
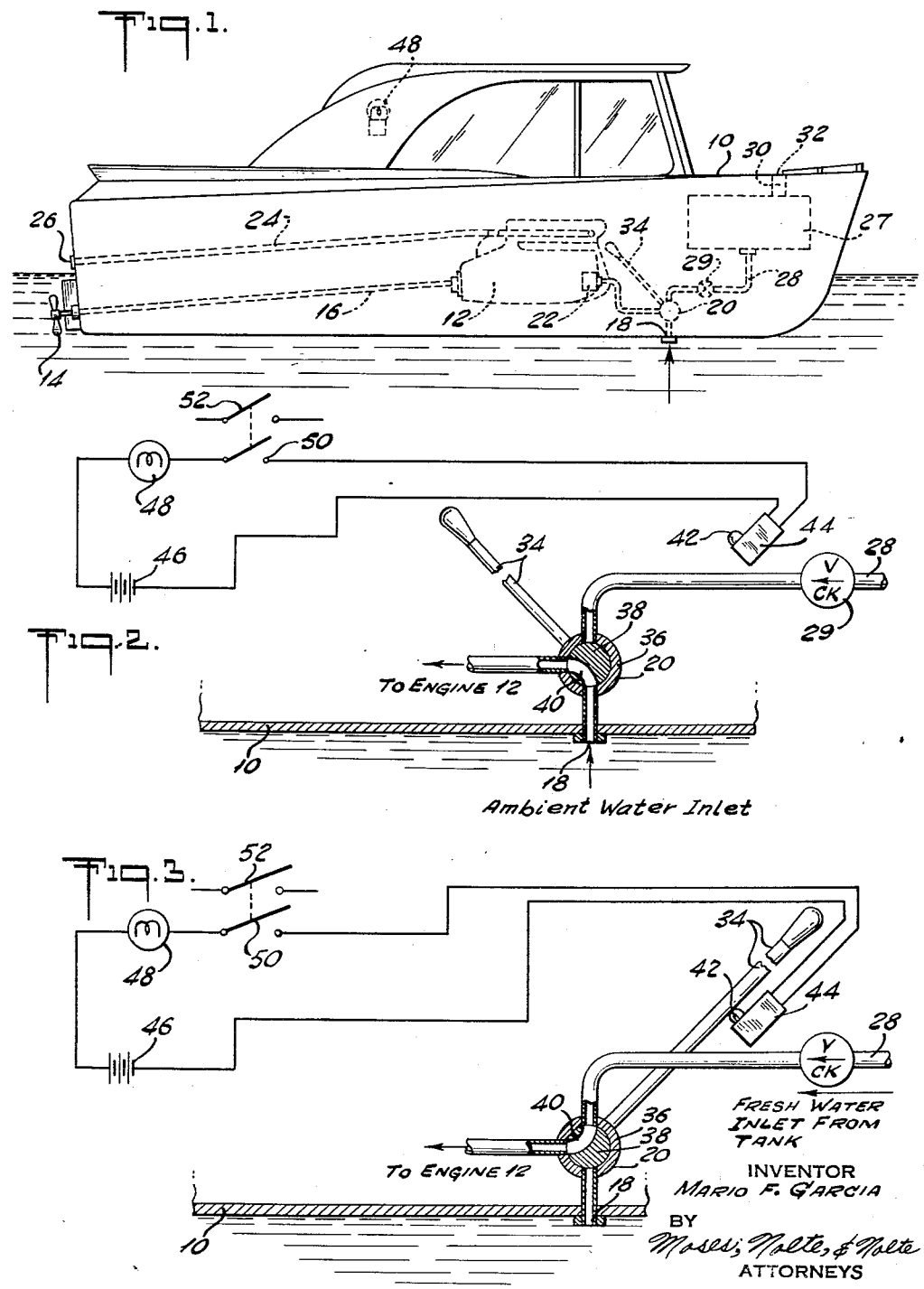

United States Patent Office 2,953,125
Patented Sept. 20, 1960

2,953,125

COOLING SYSTEM

Mario F. Garcia, 41 Montrose Road, Scarsdale, N.Y., assignor of thirty-three and one-third percent to Albert C. Nolte, Jr., New York, N.Y.

Filed July 25, 1958, Ser. No. 750,971

8 Claims. (Cl. 123—41.18)

This invention relates in general to cooling systems for internal combustion engines and similar apparatus and particularly to a new and useful fresh water flushing system for a salt water cooled engine such as employed in small power boats.

Previously with internal combustion engine installation for marine use, it is usual to provide for the direct cooling of the engine by readily available sea water. In some instances, the sea water is used to reduce the temperature of a large quantity of fresh water which is circulated continuously through the engine. In the latter instances, a separate heat exchanger was required to carry away the heat of the fresh water or a long conduit for the fresh water was located in contact with the sea to effect its cooling. In those instances where salt water was used to cool the engine directly by circulating it through the engine block, corrosion within the engine would cause serious damage to the engine. Even with the use of a separate salt water-fresh water heat exchanger or cooling conduit corrosion within the heat exchanger or conduit was likely to result, with a consequent reduction in heat exchanger efficiency and ultimate complete damage thereto.

The present invention provides all the advantages of using the abundantly available sea water to directly cool the engine as well as obviate the disadvantages of the resultant corrosion to the engine parts. The present invention includes an auxiliary connection to a fresh water tank supply and includes a novel hand-switching mechanism for connecting the cooling system of the engine to the fresh water supply for flushing and storing purposes after the end of a run. The invention includes a warning means for indicating that the fresh water is being used for engine cooling purposes as well as a simple means for rapidly switching over to a salt water cooling suction. A feature of the invention is the simple means for switching the engine cooling water circulating system from sea suction to suction from a fresh water reservoir tank.

Accordingly it is an object of this invention to provide an improved engine cooling system.

A further object of the invention is to provide means for rapidly switching from sea water suction to fresh water suction in a liquid circulating heat exchanger device.

A further object of the invention is to provide an improved fresh water flushing system for a marine internal combustion engine.

A further object of the invention is to provide a fresh water-salt water interchangeable circulation system for an internal combustion engine which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

Fig. 1 is a somewhat schematic side elevation of a small boat indicating an internal engine cooling system constructed in accordance with the invention;

Fig. 2 is a somewhat schematic partial section and partial elevation of a salt water-fresh water control valve and actuating handle, and an electrical warning indicator constructed in accordance with the invention; and Fig. 3 is a view similar to Fig. 2 but indicating the fresh water-salt water control handle in the fresh water operating position.

Referring to the drawings in particular the invention is embodied therein on a small power boat 10 having an internal combustion engine 12 arranged to rotate a screw propeller 14 affixed to a shaft 16.

In accordance with the invention when the boat 10 is under way, the engine 12 is cooled by sea water which circulates through an inlet 18, a control valve 20 to an engine cooling water circulating pump 22.

The sea water passes through the engine block and maintains the engine at the proper operating temperatures, and the heated water is discharged through a combination inclined discharge conduit and engine exhaust 24 through a discharge opening 26 at the stern of the boat.

In accordance with the invention means are provided to rapidly switch from the normal operating circulation of sea water to the circulation of fresh water to insure that the engine is flushed clean of any corrosive salts and to fill the block with fresh water when the engine is idle.

In the present instance fresh water from a fresh water reservoir tank 27 is circulated downwardly through a conduit 28 and a one way or check valve 29 to the control valve 20. The check valve 29 permits flow from the reservoir tank 27 downwardly to the control valve 20 but not vice-versa, and thus prevents possible salt water contamination of the fresh water tank. Fresh water may be supplied to the tank 27 for filling purposes through a conduit 30 and through an opening 32 in the deck.

In accordance with the invention the control valve 20 is a two way valve having an elongated control handle 34 which is movable from the salt water operating position indicated in Fig. 2. For this purpose, the control valve 20 includes a cylindrical outer casing 36 in which is rotatable an inner cylindrical member 38. The cylindrical member 38 is provided with a curved passage 40 which is movable between alignment with the suction line of the pump 22 and the salt water inlet 18, to a position in alignment with the suction line of the pump 22 and the conduit 28 leading to the fresh water reservoir tank 27.

When the handle 34 is in the position indicated in Fig. 3 in which the fresh water tank 27 is supplying cooling water to the engine 12, the handle rests against a button 42 of a normally open electrical switch 44. The switch 44 is connected in an electrical circuit to a power source 46 which is in series with a lamp 48. When the handle 34 is pressed against the button 42, the lamp 48 is lighted indicating that the engine is running on a fresh water cooling system supply. To prevent burn-out of the lamp 48 the lamp circuit is provided with a switch 50 which is linked to an ignition circuit switch 52 and is disengaged or engaged in accordance with similar actuation of the ignition switch.

Thus the apparatus permits easy rapid switching of the suction line of a cooling system from a salt water supply to a fresh water supply. In the operation of the small power boat 10 it is preferred to run the engine when under way on a salt water cooling supply through the inlet 18.

After returning to a berth and before the engine is shut off, it is preferable to switch from the salt water cooling to the fresh water cooling by turning the handle to the position indicated in Fig. 3. After the engine is run for a short period with the fresh water circulating therethrough, it is shut down and allowed to stand with its cooling system filled with fresh water.

The invention permits normal operation using salt water as a coolant without the deleterious effects of corrosion present heretofore. In some instances, it is preferable to provide a separate fresh water reservoir tank which is separate from the fresh water supply system and then provide means for adding corrosion inhibitor to the fresh water to prevent any localized corrosive action by the salt water which has passed through the engine during the run.

While a specific embodiment of the invention has been shown and described in detail to illustrate the application of the invention principles, it will be understood that the invention may be embodied otherwise without departing from such principles.

I claim:

1. In a marine propulsion unit including a heat exchanger, means to circulate liquid through said heat exchanger, sea suction means connected to said liquid circulating means, fresh water suction means connected to said liquid circulating means, and single rotatable valve means located at the connection of said fresh water suction means said sea suction means with said circulating means to connect in the alternative said sea suction means and said fresh water suction means with said circulating means.

2. In a power boat having an internal combustion engine including means for circulating cooling liquid through said engine, the improvement comprising conduit means for connecting a sea suction to said internal combustion engine circulating cooling means, conduit means for connecting a fresh water suction to said circulating liquid combustion engine cooling means at the location of said sea suction conduit means connection, and single valve means located at said connection for connecting said circulating liquid cooling system with said fresh water to the exclusion of said sea water suction and connecting said salt water suction to the exclusion of said fresh water suction.

3. The combination according to claim 2 wherein said single valve means includes a rotatable two-way valve and handle means to move said valve between interconnection with said salt water suction and said engine cooling system and said fresh water and said engine cooling system.

4. The combination according to claim 3 including warning means in the path of said two-way valve operating means to indicate when said cooling system is connected to said fresh water supply.

5. An internal combustion marine engine cooling system comprising means for circulating liquids through said engine, a sea suction line connecting said circulating means, a two-way valve located at said connection, fresh water reservoir means connecting said two-way valve at said connection, said two-way valve including a rotatable element permitting interior communication between said sea suction and said circulating means and said circulating means and said fresh water suction, said rotating valve including an elongated handle for shifting the position of said valve between sea water and fresh water suction, and means for indicating when said valve is in a fresh water circulating position.

6. In an internal combustion engine having a salt water cooling system, a fresh water flushing system comprising, a fresh water reservoir, means connecting said fresh water reservoir to the cooling system including single two-way valve means adapted to shut off said salt water cooling system when said fresh water reservoir is connected to said cooling system.

7. Apparatus according to claim 6, wherein said two-way valve means includes an elongated handle and indicator means operably associated with said handle to indicate connection of said fresh water reservoir with said cooling system.

8. Apparatus according to claim 7 wherein said fresh water reservoir connecting means includes check valve means to prevent flow of salt water into said fresh water reservoir.

References Cited in the file of this patent

UNITED STATES PATENTS 2,387,700 Cribb _____ Oct. 23, 1945